Sept. 11, 1951     P. V. PALMQUIST ET AL     2,567,233
REFLEX-REFLECTIVE SHEET MATERIAL USEFUL FOR
PROTECTIVE GARMENTS AND THE LIKE
Filed Sept. 19, 1946

Reflex-reflective fabric trim

Glass beads
Reflective bonding coat
Sizing coat
Cloth backing.

Inventors
Philip V. Palmquist
Ambrose F. Schmelzle
Raymond S. Bye

By

Carpenter, Abbott, Coulter & Kinney
Attorneys

Patented Sept. 11, 1951 2,567,233

UNITED STATES PATENT OFFICE 2,567,233

REFLEX-REFLECTIVE SHEET MATERIAL USEFUL FOR PROTECTIVE GARMENTS AND THE LIKE

Philip V. Palmquist, Canada Township, Ramsey County, and Ambrose F. Schmelzle and Raymond S. Bye, St. Paul, Minn., assignors to Minnesota Mining & Manufacturing Company, St. Paul, Minn., a corporation of Delaware Application September 19, 1946, Serial No. 697,914

7 Claims. (Cl. 88—82)

This invention relates to reflex-reflective sheet material such as fabric or the like, adapted for conversion to raincoats, jackets, and other garments. The reflective fabric is flexible, strong and tough, and water resistant, and thus in the form of a cape or coat affords the wearer adequate protection against inclement weather with no undue discomfort or inconvenience. Most particularly, however, such garments, by virtue of their reflex-reflective outer surfaces, are rendered strikingly visible at night when illuminated by a beam of light emanating from a position adjacent the viewer (such as the headlights of motor vehicles), and thus provide protection from traffic accidents and the like under conditions during which such accidents are normally unusually frequent. The reflective surface coating consists, in the present invention, of a light-reflective binder coating in which is partially embedded a firmly but resiliently bonded surface layer of small transparent convex lens elements such as glass beads or spheres, preferably having a refractive index of approximately 1.7–1.9, and a diameter of less than 10 mils. The optical principles will be found discussed in the Gebhard, Heltzer, Clarke and Davis Patent No. 2,326,634.

Figure 1:
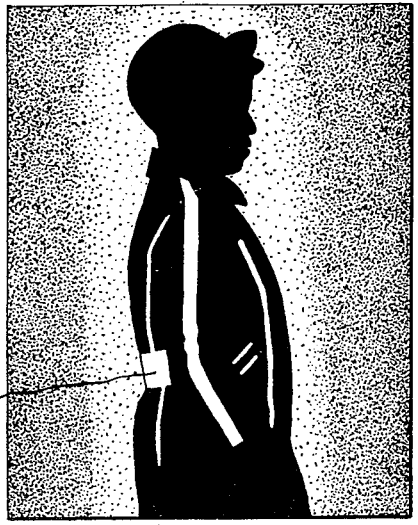

Figure 1 of the accompanying drawing represents a night-time view of a jacket trimmed with the reflex-reflective sheet material of this invention as it appears to the driver of a motor vehicle when approaching the wearer.

Figure 2:

Figure 2 is a representation of the fabric-base reflex-reflective sheet material in cross-section, showing the transparent convex lens elements (glass beads) held by the reflective bonding coat and supported on the flexible sized fabric base.

For many purposes, sphere-coated reflective surfaces need not be particularly weather-resistant or waterproof; nor need they be uniformly flexible under extremes of heat and cold, humidity, or the like. Properties of high abrasion resistance, high adhesion between sphere and backing member under severe and repeated flexing, extended useful life, and other features have not been generally required of sphere-coated reflective sheet materials used heretofore. Thus, for portable reflective screens used in the showing of home movies, there exists no problem of weathering nor of water-resistance nor cold-flexibility; hence a soft and flexible, but weak and thermoplastic type of sphere-bonding agent may be used. On the other hand, outdoor signboards, highway markers, and the like, which are commonly covered with sphere-coated reflective sheet material, require a highly weatherproof sheet which after application to the rigid metal or wooden base need not remain flexible. Weatherproof bonding agents are therefore employed for such constructions which, while initially somewhat flexible, become hard and brittle when used as intended.

It is an object of the present invention to provide a reflective sheet material suitable for use in the manufacture of garments, in which transparent glass lens elements are held by a tough, flexible, long-aging, weather-resistant bonding composition which has a high and permanent adhesion to the glass, and which maintains such adhesion over a usefully wide range of temperatures, and under severe and repeated flexing. A particular object is to provide a reflective sheet material carrying a permanently bonded surface layer of small transparent glass spheres and having the proper qualities of strength, waterproofness, weather-resistance, flexibility and drape under various temperature conditions, etc., to insure its usefulness and desirability in the form of protective garments such as raincoats and jackets. The draping qualities of our flexible sheet material are quite different from those of previously known flexible reflective sheets. For example, sleeves of jackets made from reflective fabric prepared according to this invention are easily bent, creased and folded, and give no impression of excessive stiffness.

For bonding agents designed to provide a bond between a fabric and small glass beads, a high adhesion value between binder and glass is required. Such adhesion value is conveniently measured against a flat pane of similar glass composition. Thermosetting compositions such as those hereinafter described are coated, dried, heated until cured to the optimum degree, and tested, as in the following procedure. For example, in testing the composition of Example 1, the adhesive in plastic solution form was coated, by means of a knife coater having an 8 mil effective orifice, on a clean glass plate. Porous glass-fiber cloth, reinforced on the back side with a high-strength unified paper pressuresensitive adhesive tape, was pressed down onto the adhesive layer. The composite was then cured in an oven at 100° C. for 2 hours. After cooling, the bond between glass plate and adhesive was determined by stripping the cloth and the attached adhesive layer from the plate at an angle of 180°, using a Scott Inclined Plane Serigraph Model IP–4, and measuring the grams of force required per inch width of removal area. Tests of this and other adhesives have shown that an adhesion value of not less than about 3500 grams per inch width is required in an adhesive in order to be assured of permanently retaining small glass spheres on a flexible coated fabric adapted for use in making outdoor wearing apparel.

Elastic modulus of the adhesive compositions is also important in defining the type of adhesive required to provide best results, and is conveniently determined on the Scott Inclined Plane Serigraph. The adhesive composition of Example 1, for example, was cast in a thin film on an amalgamated tin panel, dried to remove solvent, and heated as in the adhesion test procedure. The cured film was removed, cut to shape, and tested for stress-strain characteristics. The modulus of elasticity was determined at 50% elongation and at the desired temperature range, using for the calculation the formula $$M_{50} = \frac{3F_{50}}{A}$$

where $M_{50}$=modulus at 50% elongation, in kilograms per sq. cm.

$F_{50}$=force in kilograms to produce 50% elongation $A$=original thickness (cm.) x original width (cm.)

In making this calculation, it is assumed that the cross-sectional area is constant over the elastically stretched portion of the test piece. Adhesives which under these conditions, had an $M_{50}$ value of at least about 20 kilograms/sq. cm., and preferably between about 30 and 300 kilograms/sq. cm., at the temperature experienced under conditions of use were found to be suitable for obtaining proper pliability, "drape," and other similar qualities in garments prepared from coated fabrics made therewith. Compositions which in the above test break before reaching an elongation of 50% are apt to be stiff and brittle, and frequently result in cracking and even flaking in the finished product. On the other hand, compositions having too low a modulus value are found to be soft and stretchy; glass beads bonded with such material are readily removed by rubbing or scraping, even though the adhesion value as here measured may be quite high.

Since adhesion to glass and brittleness both normally increase on long-continued heating of a thermosetting adhesive, the time and temperature employed in curing the test samples is regulated so as to obtain maximum adhesion while still maintaining elastic modulus values within the preferred or permitted range. The same time and temperature is then to be employed in curing the coated fabric.

It was found that the combination of properties required in a bonding adhesive suitable for bonding glass beads to fabric in producing reflective sheet materials according to this invention was obtainable with certain combinations of ingredients, comprising elastic polymers and adhesion-inducing and curing agents. One such combination was composed of a reflective pigment in a mixture of fifteen parts by weight of a rubbery butadiene-acrylonitrile polymer, ten parts of a phenolic resin, and 4.5 parts of a compatible liquid plasticizer, dissolved in an organic solvent to a coatable viscosity, as shown in the following example. In this and other examples, the formula is given in parts by weight unless otherwise indicated.

*Example 1*

Fabric backing_____blue cotton drills
Sizing coat, applied by hot calendering:
    Rubbery butadiene-acrylonitrile
      polymer _____ 15
    Compatible heat-reactive phenolic
      resin _____ 10
    Plasticizer _____ 4.5
Bonding coat, applied by knife spreader:
    Formula of sizing coat_____ 29.5
    Aluminum flake pigment (reflective
      pigment) _____ 2.95
    Methyl isobutyl ketone to 30% solids; solution has a viscosity of approximately 14000 centipoises at room temperature.
Autocollimating layer_____glass beads
    No. 14 size (approximately 3 mils diameter). Refractive index about 1.9.

The sizing coat was first compounded on a rubber mill, and was then applied to the fabric base by means of a 3-roll calender. Calender roll temperatures, pressure, and speeds were so adjusted as to provide essentially a surface coating of the composition on the fabric, with only minor penetration, and the coated surface was given a smooth finish. This provided a smooth and non-porous surface for the reflex-reflective coating, and at the same time did not itself appreciably reduce the flexibility and draping qualities of the product. The weight of sizing coat applied was 38 grains per unit area of 24 square inches. When a smoother cloth, such as a thin cotton sheeting, replaced the cotton drills, a reduction in the amount of sizing applied was possible, resulting in an even more flexible finished product. Unwoven fabrics such as felted sheet materials are also desirable for similar reasons.

The reflective bonding coat was applied in a thin uniform layer of 14–16 grains per unit area over the sizing coat. The glass beads were spread over the partially dried tacky coated surface, and excess beads were then shaken off, to provide a final weight of beads of 45–55 grains per unit area. The beaded surface was in some instances then lightly pressed to provide a more level surface. Preliminary evaporation of solvent before application of beads was so controlled that the surface of the adhesive was desirably tacky without being so soft and fluid as to permit the beads to become completely submerged. Thus, where methyl ethyl ketone replaced the methyl isobutyl ketone, a somewhat shorter drying period was required between coating the adhesive and applying the glass beads.

The bonding coat, together with the sizing coat where such is required, may alternatively be applied in stripes, blocks, or other discontinuous patterns rather than over the entire surface of the fabric. A porous reflective coated fabric sheet material may be obtained in this way.

After further evaporation of solvent at moderate temperature, the sheet was heated for two hours at 100° C. The resulting product viewed from the beaded side had a uniformly silvergray appearance, and was highly reflex-reflective. It was soft and flexible, and could be easily cut to shape and sewed into garments which were found to have desirable draping and wearing qualities. Sections of the coated fabric could be vigorously rubbed together in face-to-face relationship without significant bead loss and without cracking or otherwise harming the sizing and bonding films.

In the above example, the polymer employed was a copolymer of 55 parts of butadiene and 45 parts of acrylonitrile. "Hycar OR–15," a product of the B. F. Goodrich Chemical Co. of Cleveland, Ohio, is substantially of this composition and has given good results. Variations both in ratio and identity of monomers which produce analogous copolymers are contemplated. For example, a copolymer of 55 parts of butadiene and 45 parts of methacrylonitrile has been successfully employed in these compositions, as has a copolymer of 60 parts butadiene and 40 parts acrylonitrile.

One example of a compatible heat-reactive phenolic resin suitable for use in Example 1 may be prepared by heating together one mol of phenol and one-half mol of acetaldehyde, at a pH of about 1.0, for about one-half hour, then adding 0.5–0.6 mol of formaldehyde in the form of hexamethylenetetramine and cautiously heating to 110° C. The product is a rather brittle solid resin which is soluble in methyl ethyl ketone but insoluble in benzene. It has a temporary melting point of 80–90°. On continued heating, e. g. at 110° C., the resin advances to a less soluble form having a higher melting-point. Other phenols, e. g. meta-cresol, may replace part or all of the phenol, and other aldehydes or combinations of aldehydes may be utilized. "Durez 175" resin, a product of Durez Plastics and Chemicals, Inc., North Tonawanda, New York, is a commercially available resin which has given good results when used in the formula of Example 1; it is soluble in methyl ethyl ketone, insoluble in benzene, has a temporary melting-point of 85° C., and is understood to be the reaction product obtained from phenol, acetaldehyde and formaldehyde in the approximate molar ratio of 1.0:0.25:0.95. Another commercial resin which is equally effective is "Varcum 5476" resin, a product of Varcum Chemical Corp., Niagara Falls, New York.

Dioctyl phthalate is one example of a plasticizer which has given good results in formulas such as that of Example 1; dibutyl sebacate, tributoxy ethyl phosphate, or other analogous plasticizers, may, however, be substituted therefor in whole or in part.

The bonding coat of the above example was tested for adhesion to glass and for elastic modulus by the methods hereinbefore described, after curing the test samples for 2 hours at 100° C. The values obtained were adhesion 8000 grams per inch, and elastic modulus at 50% elongation 100 kg./sq. cm., both measured at 25° C. The stretched film showed considerable elastic recovery or regain when released.

Example 2

A bonding composition was prepared consisting of 10 parts of polychloroprene ("Neoprene CG"), 15 parts compatible oil-soluble heat-reactive phenol-aldehyde resin ("Bakelite 3360"), 5 parts of dioctyl phthalate, 0.5 part zinc oxide, and 0.4 part magnesium oxide, dissolved to desired viscosity in butyl acetate; to this was added 1.6 parts of aluminum flake as the reflective pigment. The resulting composition was tested, after curing for 2 hours at 100° C., for adhesion and for elastic properties. Adhesion to glass was 11,000 grams per inch; modulus at 50% was 31 kg./sq. cm. The composition was coated on the sized cloth of Example 1, surfaced with glass beads, dried, and cured for 2 hours at 100° C. The resulting coated reflex-reflective fabric could be formed into wearable jackets and other garments having good draping qualities and excellent bead retention. By increasing the content of aluminum flake in the above formula to 3.0 parts, the brilliancy of reflection from the coated sheet was desirably increased.

Example 3

Another composition, which formed a firm but resilient bond to glass beads as well as to fabric, and produced a flexible, weather-resistant, and well-bonded beaded fabric, was prepared from a modified Buna S-type polymer and an oil-soluble reactive phenolic resin, but without a plasticizer.

In this example, a rubbery copolymer of 50 parts butadiene, 40 parts styrene, and 10 parts acrylonitrile was used with an equal weight of a compatible oil-soluble heat-advancing phenol-aldehyde resin, dissolved in butyl acetate, and with 10 parts of aluminum flake reflective pigment added per 100 parts of polymer-resin solids. The resin was an alkali-catalyzed reaction product of ortho-phenyl phenol and formaldehyde; and corresponded to the "Bakelite 3360" resin of Example 2. The coated product, as well as test samples for adhesion and modulus tests, was adequately cured by heating for 2 hours at 100° C.

Example 4

In this example, the bead-bonding composition was composed of a butadiene-styrene (GR–S) polymer, a non-reactive adhesion-inducing resin, and a small amount of a compatible heat-reactive resin. The composition was highly effective as a flexible permanent binder for small glass beads when protected from the deteriorating effect of sunlight or the like.

|  | Parts by weight |
|---|---|
| Butadiene-styrene polymer | 700 |
| Soft coumarone-indene resin ("R–29" resin, a product of The Neville Co.) | 700 |
| Rosin | 140 |
| Oil-soluble heat-advancing phenol-aldehyde resin ("Bakelite 3360" resin) | 56 |
| Titanium dioxide pigment | 70 |
| Zinc resinate | 140 |
| Heptane (solvent) | 2700 |

The polymer and pigment were first milled together. The resins were then added to the milled base in a heavy-duty internal mixer, and the batch was heated for partial reaction to a stage at which it could still be readily dispersed in solvent. A sheet of cellulose acetate cloth was coated with the composition and surfaced with partially embedded small glass beads having a refractive index of 1.9. After drying, the sheet was heated for 15 minutes at 70° C. followed by one hour at 100° C. The product was flexible, strong and tough, and well suited for use in reflex-reflective jackets or the like. When exposed to ultraviolet light it showed a tendency gradually to become somewhat stiff and to lose beads.

In the above examples various types of resins, compatible with the particular polymers employed, have been used as adhesion-inducing agents to provide the required high adhesion to glass. Various compatible phenolic resins have likewise been employed, both as adhesion-inducing agents and as curing agents to provide the required range of adhesion value and elastic properties. Other adhesion-inducing and/or curing agents may also be used with these or other polymers to produce effective bonding compositions. For example, an alkyd resin formed by reacting glycerol with a rosin-maleic anhydride adduct has provided an effective degree of adhesion when combined with Hycar OR-15 polymer and a plasticizer and properly cured, as by prolonged heating in the presence of a small amount of a urea-formaldehyde resin.

The application of small glass spheres to reflective surfaces for the purpose of obtaining reflex reflection is well known in the art, and in this connection particular reference is made to U. S. Patent No. 2,326,634 hereinabove mentioned. The present invention provides a reflex-reflective article in the form of a flexible, wear-resistant and weather-resistant fabric which is suitable for conversion to garments, such as jackets or the like. Garments prepared from such fabric are soft and flexible, wear well, and remain reflex-reflective even under drastic service conditions. The fabric may be used as trim as well as for the entire garment. When used as trim or edging, the sheet may be applied to a cloth jacket or the like in various ways, e. g. by sewing, or by means of a suitable adhesive. For example, the reflective fabric may be provided with a heat-activated or solvent-activated adhesive applied to the non-reflective surface. For such use, it is also possible to eliminate the fabric or other backing of the reflex-reflective sheet, and to adhesively bond the glass bead-binder coat layer directly to the garment or fabric. For example, the bonding layer and glass beads may be combined on a temporary carrier web which is later removed, whereupon a flexible and well-bonded reflective sheet is obtained suitable for application by means of a solvent- or heat-activated adhesive to a jacket.

One way of demonstrating the extreme difference between the wearing qualities of our novel reflex-reflective sheet material and those of prior art materials is by means of an abrasion test. In this test, a sample of the glass bead coated fabric or other reflective sheet material is flexed and abraded under tension. The strip is mechanically pulled back and forth over a fixed bar of ½ inch radius and under a scraper bar or knife placed in line with and directly over the bar, and in pressure contact with the beaded surface of the test strip. The ends of the strip are 90° apart. The number of cycles required to produce a noticeable loss of beads from the reflex-reflective surface is taken as the abrasion resistance of the sheet. In many cases of prior art sheet products, the flexibility and strength of the backing was found to be entirely inadequate for carrying out the abrasion test. The bead-bonding compositions of such products were therefore applied to a stronger type of backing such as sized cotton drills prepared as in Example 1 hereinabove; glass beads were applied, the coating dried or otherwise cured as required, and the sample sheets tested in comparison with samples produced according to the examples herein disclosed. The following results were obtained. (Adhesion and $M_{50}$ values of certain of the reflective bonding compositions, measured as previously described, are included for convenience.)

| | Product tested | Abrasion resistance | Adhesion | $M_{50}$ |
|---|---|---|---|---|
| 1 | commercial beaded home "movie" screen. | 23 | | |
| 2 | glass beads bonded to sized drills of Ex. 1 with plasticized pigmented nitrocellulose lacquer as used for "movie" screens. | 3 | 1,000 | 26. |
| 3 | as above using alkyd resin enamel. | 37 | | |
| 4 | reactive castor oil modified amino-aldehyde resin sizing and bonding coat, aged one month at normal room temperature. | 13 | 2,700 | (1,000 at 10%).[1] |
| 5 | fabric of Example 1 | 500+ | 8,000 | 100. |
| 6 | fabric of Example 2 | 317 | 11,000 | 31. |
| 7 | fabric of Example 3 | 492 | 6,500 | 72. |

[1] This film broke before reaching an elongation of 50% on the Serigraph. The force required to produce an elongation of 10% was 91 kilograms per initial square centimeter cross-section, which is equivalent to a modulus value of 1000 kg./sq. cm. at 10% elongation.

While specific compositions have been here described as preferred adhesive bonding agents for bonding glass beads to fabric or the like, and specific procedures described for preparing the reflective sheet material, the invention is not limited to structures involving these compositions and procedures, but is instead directed to the novel wearable reflex-reflective sheet material however prepared. For example, a calender-coated fabric similar to the sized fabric of Example 1, but containing a reflective pigment in the sizing layer, is solvent-activated and coated with glass beads, which are preferably pressed into proper position in the surface of the bond by means of light squeeze-roll pressure. Use of a dilute solution of a glass-adherent binder composition in place of the solvent is still more effective in obtaining maximum adhesion to the glass by this procedure. Another method involves the use of a heat-activated but thermosetting adhesive: for example, the sized and bead-bond-coated fabric of Example 1 or 2 is dried at moderate temperature, and is then coated with glass beads under pressure and at an elevated temperature sufficient to render the bond temporarily active; continued heating then cures the bond to its final elastic and permanently bonded state. In a modification of this or of the previous procedure, the glass beads are first individually coated with a transparent binder, e. g. the sizing coat of Example 1, applied from solution in methyl isobutyl ketone.

Smooth-surfaced fabric may be used, permitting a reduction in the amount of sizing coat required to provide a smooth and dense yet flexible base for the reflex-reflective coating. Other sheet materials of desirable flexibility, density, and other properties, e. g. leather, synthetic resinous films, etc. may be substituted for the sized or unsized cloth where special effects are desired. Within certain limitations, the base sheet material or even the reflective product may be additionally treated, as with water-repellent materials, etc., so long as its flexibility and drape, and other properties necessary or desirable in the manufacture of attractive and useful garments, are not greatly altered.

In place of aluminum flake, other reflective pigments, such as titanium dioxide, as well as other pigments or dyes, may be included in the reflective layer.

Various other differences, either in materials, or method of making, or ultimate structure of our novel flexible and wearable reflex-reflective fabric, are contemplated as being equivalent to those here described and as coming within the scope of the appended claims.

Having now described various illustrative embodiments of our invention, but without intent to be limited thereto, what we claim is as follows:

1. A flexible, weather-resistant, reflex-reflective sheet material suitable for incorporation into garments such as jackets or the like, in which form it retains its reflex-reflective properties under repeated flexing and outdoor use conditions, said sheet material including a permanently flexible and weather-resistant reflective binder layer and an exposed surface layer of contiguous small glass spheres having a refractive index of about 1.7–1.9, the spheres being partially embedded and firmly bonded in the binder layer, said binder essentially comprising a reflective pigment, a rubbery polymer and a heat-advancing phenol-aldehyde resin compatible therewith, said binder being heat-cured and having an adhesion to glass of at least about 3500 grams/inch width and having a modulus of elasticity at 50% elongation of about 30 to 300 kilograms/sq. cm., both as herein defined.

2. A flexible, weather-resistant, reflex-reflective sheet material suitable for incorporation into garments such as jackets or the like, in which form it retains its reflex-reflective properties under repeated flexing and outdoor use conditions, said sheet material including a permanently flexible and weather-resistant reflective binder layer and an exposed surface layer of contiguous small glass spheres having a refractive index of about 1.7–1.9, the spheres being partially embedded and firmly bonded in the binder layer, said binder essentially comprising a reflective pigment, a rubbery butadiene-acrylonitrile polymer, a heat-advancing, ketone-soluble, benzene-insoluble phenol-aldehyde resin compatible therewith, and a plasticizer, said binder being heat-cured and having an adhesion to glass of at least about 3500 grams/inch width and a modulus of elasticity at 50% elongation of about 30 to 300 kilograms/sq. cm., both as herein defined.

3. A flexible, weather-resistant, reflex-reflective sheet material suitable for incorporation into garments such as jackets or the like, in which form it retains its reflex-reflective properties under repeated flexing and outdoor use conditions, said sheet material including a permanently flexible and weather-resistant reflective binder layer and an exposed surface layer of contiguous small glass spheres having a refractive index of about 1.7–1.9, the spheres being partially embedded and firmly bonded in the binder layer, said binder essentially comprising a reflective pigment, about 15 parts of a rubbery butadiene-acrylonitrile polymer, about 10 parts of a heat-advancing, ketone-soluble, benzene-insoluble phenol-aldehyde resin compatible therewith, and about 4.5 parts of a liquid ester type plasticizer, said binder being heat-cured and having an adhesion to glass of at least about 3500 grams/inch width and a modulus of elasticity at 50% elongation of about 30 to 300 kilograms/sq. cm., both as herein defined.

4. A flexible, weather-resistant, reflex-reflective sheet material suitable for incorporation into garments such as jackets or the like, in which form it retains its reflex-reflective properties under repeated flexing and outdoor use conditions, said sheet comprising a thin flexible base sheet material, an exposed surface layer of firmly bonded contiguous small glass spheres having a refractive index of about 1.7–1.9, and an interposed permanently flexible and weather-resistant reflective binder layer in which the glass spheres are partially embedded, said binder essentially comprising a reflective pigment, an elastic rubbery polymer, and a heat-advancing phenol-aldehyde resin compatible therewith, said binder being heat-cured and having an adhesion to glass of at least about 3500 grams/inch width and a modulus of elasticity at 50% elongation of about 30 to 300 kilograms/sq. cm., both as herein defined.

5. A flexible, weather-resistant, reflex-reflective fabric sheet material suitable for incorporation into garments such as jackets or the like, in which form it retains its reflex-reflective properties under repeated flexing and outdoor use conditions, said fabric sheet comprising a fabric base, an exposed surface layer of firmly bonded contiguous small glass sphere lens elements having a refractive index of about 1.7–1.9, and an interposed permanently flexible and weather-resistant reflective binder in which the lens elements are partially embedded, said binder essentially comprising a reflective pigment, an elastic rubbery polymer, and a heat-advancing phenol-aldehyde resin compatible therewith, said bond being heat-cured and having an adhesion to glass of at least about 3500 grams/inch width and a modulus of elasticity at 50% elongation of about 30 to 300 kilograms/sq. cm., both as herein defined.

6. A flexible, weather-resistant, reflex-reflective fabric sheet material suitable for incorporation into garments such as jackets or the like, in which form it retains its reflex-reflective properties under repeated flexing and outdoor use conditions, said fabric sheet comprising a fabric base, an exposed surface layer of firmly bonded contiguous small glass sphere lens elements having a refractive index of about 1.7–1.9, and an interposed permanently flexible and weather-resistant reflective binder in which the lens elements are partially embedded, said binder essentially comprising a reflective pigment, a rubbery butadiene-acrylonitrile polymer, a heat-advancing, ketone-soluble, benzene-insoluble phenol-aldehyde resin compatible therewith, and a plasticizer, said binder being heat-cured and having an adhesion to glass of at least about 3500 grams/inch width and a modulus of elasticity at 50% elongation of about 30 to 300 kilograms/sq. cm., both as herein defined.

7. A flexible, weather-resistant, reflex-reflective fabric sheet material suitable for incorporation into garments such as jackets or the like, in which form it retains its reflex-reflective properties under repeated flexing and outdoor use conditions, said fabric sheet comprising a fabric base, an exposed surface layer of firmly bonded contiguous small glass sphere lens elements having a refractive index of about 1.7–1.9, and an interposed permanently flexible and weather-resistant reflective binder in which the lens elements are partially embedded, said binder essentially comprising a reflective pigment, about 15 parts of a rubbery butadiene-acrylonitrile polymer, about 10 parts of a heat-advancing phenol-aldehyde resin compatible therewith, soluble in methyl ethyl ketone, and insoluble in benzene, and about 4.5 parts of a liquid ester type plasticizer, said bond being heat-cured and having an adhesion to glass of at least about 3500 grams/inch width and a modulus of elasticity at 50% elongation of about 30 to 300 kilograms/sq. cm., both as herein defined.

PHILIP V. PALMQUIST.
AMBROSE F. SCHMELZLE.
RAYMOND S. BYE.

REFERENCES CITED

The following references are of record in the file of this patent:

UNITED STATES PATENTS

| Number | Name | Date |
|---|---|---|
| 2,229,880 | Allison | Jan. 28, 1941 |
| 2,326,634 | Gebhard et al. | Aug. 10, 1943 |
| 2,354,018 | Holtzer et al. | July 18, 1944 |
| 2,371,870 | Brown et al. | Mar. 20, 1945 |
| 2,376,854 | Saunders et al. | May 22, 1945 |
| 2,394,783 | Keeler et al. | Feb. 12, 1946 |
| 2,398,890 | Howard | Apr. 23, 1946 |
| 2,405,038 | Jennings | July 30, 1946 |
| 2,407,680 | Palmquist et al. | Sept. 17, 1946 |
| 2,411,878 | Hershberger | Dec. 3, 1946 |
| 2,422,256 | Phillippi | June 17, 1947 |
| 2,427,519 | Blyer | Sept. 16, 1947 |
| 2,429,397 | Compton et al. | Oct. 21, 1947 |